US012762586B1

(12) United States Patent
Weisberg et al.

(10) Patent No.: US 12,762,586 B1
(45) Date of Patent: Oct. 13, 2026

(54) DIGITAL PROMOTION SYSTEM INCLUDING NFC TAG BASED LOYALTY PROGRAM JOINING AND RELATED METHODS

(71) Applicant: Inmar Clearing, Inc., Winston-Salem, NC (US)

(72) Inventors: Rob Weisberg, Lexington, MA (US); Andreas M. Benamou, Spicewood, TX (US); Andrew B. Jump, Lewisville, NC (US); Srinivasan Varadarajan, Winston-Salem, NC (US); Matthew Sheffield, Green Cove Springs, FL (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 18/394,149

(22) Filed: Dec. 22, 2023

(51) Int. Cl.

| | |
|---|---|
| ***G06Q 30/00*** | (2023.01) |
| ***G06F 21/31*** | (2013.01) |
| ***G06K 7/10*** | (2006.01) |
| ***G06K 19/07*** | (2006.01) |
| ***G06Q 30/0226*** | (2023.01) |

(52) U.S. Cl.
CPC ......... *G06Q 30/0231* (2013.01); *G06F 21/31* (2013.01); *G06K 7/10297* (2013.01); *G06K 19/0723* (2013.01)

(58) Field of Classification Search
CPC ................ G06Q 30/0231; G06F 21/31; G06K 7/10297; G06K 19/0723
See application file for complete search history.

(56) References Cited

U.S. PATENT DOCUMENTS

| | | | | |
|---|---|---|---|---|
| 8,799,085 | B2 | 8/2014 | Fisher | |
| 9,002,727 | B2 | 4/2015 | Horowitz et al. | |
| 9,727,889 | B2 | 8/2017 | Horowitz et al. | |
| 9,824,366 | B2 | 11/2017 | Skowronek et al. | |
| 10,657,550 | B2 | 5/2020 | Misra et al. | |
| 11,182,821 | B2 | 11/2021 | Wolinsky et al. | |
| 11,250,458 | B1 * | 2/2022 | Moser, III | G07F 17/0035 |
| 2012/0310720 | A1 * | 12/2012 | Balsan | G06Q 30/02 705/14.26 |
| 2013/0325567 | A1 * | 12/2013 | Bradley | G06Q 30/02 705/14.1 |
| 2014/0374474 | A1 * | 12/2014 | Huang | G06Q 30/0281 235/375 |

(Continued)

*Primary Examiner* — Meredith A Long
(74) *Attorney, Agent, or Firm* — ALLEN, DYER, DOPPELT, GILCHRIST, P.A.

(57) ABSTRACT

A digital promotion processing system may include a digital promotions server, and a near field communication (NFC) tag. The NFC tag may be encoded with a tag identifier associated with a digital promotion. A shopper device may include an NFC tag reader cooperating with a controller to, upon the shopper device being adjacent the NFC tag, wirelessly obtain the tag identifier, and communicate the tag identifier to the server. The server may determine the digital promotion associated with the tag identifier, and determine whether the shopper is associated with a loyalty program, and when not, cooperate with the shopper device to prompt the shopper to join the loyalty program, and upon joining the loyalty program, save the digital promotion to a digital wallet. The server may, when the shopper is associated with the loyalty program, save the digital promotion to the digital wallet without prompting the shopper.

18 Claims, 9 Drawing Sheets

(56) References Cited

U.S. PATENT DOCUMENTS

| | | | | |
|---|---|---|---|---|
| 2015/0263791 | A1* | 9/2015 | Chein | H04W 4/02<br>455/41.1 |
| 2016/0189461 | A1* | 6/2016 | Kanon | G07F 9/001<br>705/51 |
| 2018/0137533 | A1* | 5/2018 | Pilarz | G06Q 30/0233 |
| 2018/0276713 | A1* | 9/2018 | Nozawa | H04B 5/77 |
| 2021/0329437 | A1* | 10/2021 | Gabriele | H04B 17/318 |
| 2022/0230198 | A1 | 7/2022 | Wolinsky et al. | |

* cited by examiner

DIGITAL PROMOTION SYSTEM INCLUDING NFC TAG BASED LOYALTY PROGRAM JOINING AND RELATED METHODS

TECHNICAL FIELD

The present invention relates to the field of near field communications, and, more particularly, to near field tag based digital promotions and related methods.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

A loyalty program, from the perspective of a merchant or retailer, encourages a customer to continue to purchase the products and/or services of the retailer associated with the loyalty program. A loyalty program typically rewards the customer or user with discounts, promotions, or other benefits, which may be used toward the purchase of future products or services. A loyalty program may also permit the customer to obtain cash back or redeem points for products or services that may be provided by the retailer or another retailer, typically one that provides unrelated products or services.

SUMMARY

A digital promotion processing system may include a digital promotions server, and a near field communication (NFC) tag associated with a given product for purchase at a given retailer. The NFC tag may be encoded with an NFC tag identifier associated with a digital promotion. The digital promotion processing system may also include a shopper device associated with a given shopper and including an NFC tag reader and a controller coupled to the NFC tag reader. The controller may be configured to, upon the shopper device being adjacent the NFC tag, wirelessly obtain the NFC tag identifier, and communicate the NFC tag identifier to the digital promotions server. The digital promotions server may be configured to determine the digital promotion associated with the NFC tag identifier, and determine whether the given shopper is associated with a loyalty program associated with the given retailer, and when not, cooperate with the shopper device to prompt the given shopper to join the loyalty program, and upon joining the loyalty program save the digital promotion to a digital wallet associated with the given shopper. The digital promotions server may be configured to, when the given shopper is associated with the loyalty program, save the digital promotion to the digital wallet without prompting the given shopper.

The digital promotions server may be configured to determine whether the given shopper is associated with the loyalty program associated with the given retailer based upon an application associated with the given shopper being downloaded to the shopper device. The digital promotions server may be configured to cooperate with the shopper device to determine whether the application associated with the given retailer has been downloaded to the shopper device, and when not, cooperate with the shopper device to prompt the given shopper to download the application prior to joining the loyalty program, for example.

The digital promotions server may be configured to determine whether stored login credentials associated with the loyalty program exist for the given shopper, and determine whether the given shopper is associated with the loyalty program associated with the given retailer based upon the existence of the stored login credentials for the given shopper. The digital promotions server may be configured to save the digital promotion to the digital wallet associated with the given shopper based upon the stored login credentials, for example.

The shopper device may include a display coupled to the controller. The digital promotions server may be configured to cooperate with the shopper device to prompt the given shopper to join the loyalty program via the display, for example.

The shopper device may include a touch display coupled to the controller. The digital promotions server may be configured to cooperate with the shopper device to obtain loyalty program login credentials to join the loyalty program via input to the touch display, for example.

The digital promotions server may be configured to obtain a purchase history associated with the given shopper, and determine the digital promotion based upon the purchase history, for example. The digital promotion may have a redeemable value associated therewith, and the digital promotions server may be configured to set the redeemable value of the digital promotion based upon the purchase history.

A method aspect is directed to a method of processing a digital promotion. The method may include using a digital promotions server to cooperate with a shopper device associated with a given shopper to obtain a near field communication (NFC) tag identifier encoding an NFC tag associated with a given product for purchase at a given retailer. The shopper device may include an NFC tag reader and a controller coupled to the NFC tag reader, and the controller may be configured to, upon the shopper device being adjacent an NFC tag, wirelessly obtain the NFC tag identifier. The method may also include using the digital promotions server to determine the digital promotion associated with the NFC tag identifier encoded NFC tag, and determine whether the given shopper is associated with a loyalty program associated with the given retailer, and when not, cooperate with the shopper device to prompt the given shopper to join the loyalty program, and upon joining the loyalty program save the digital promotion to a digital wallet associated with the given shopper. The method may further include using the digital promotions server, when the given shopper is associated with the loyalty program, to save the digital promotion to the digital wallet without prompting the given shopper.

A computer readable medium aspect is directed to a non-transitory computer readable medium for processing a digital promotion. The non-transitory computer readable medium includes computer executable instructions that when executed by a processor cause the processor to perform operations. The operations may include cooperating with a shopper device associated with a given shopper to obtain a near field communication (NFC) tag identifier encoding an NFC tag associated with a given product for purchase at a given retailer. The shopper device may include an NFC tag reader and a controller coupled to the NFC tag reader, and the controller may be configured to, upon the shopper device being adjacent an NFC tag, wirelessly obtain the NFC tag identifier. The operations may also include determining the digital promotion associated with the NFC tag identifier encoded NFC tag. The operations may further include determining whether the given shopper is associated with a loyalty program associated with the given retailer, and when not, cooperating with the shopper device to prompt the given shopper to join the loyalty program, and upon joining the loyalty program save the digital promotion to a digital wallet associated with the given shopper, otherwise when the given shopper is associated with the loyalty program, saving the digital promotion to the digital wallet without prompting the given shopper.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
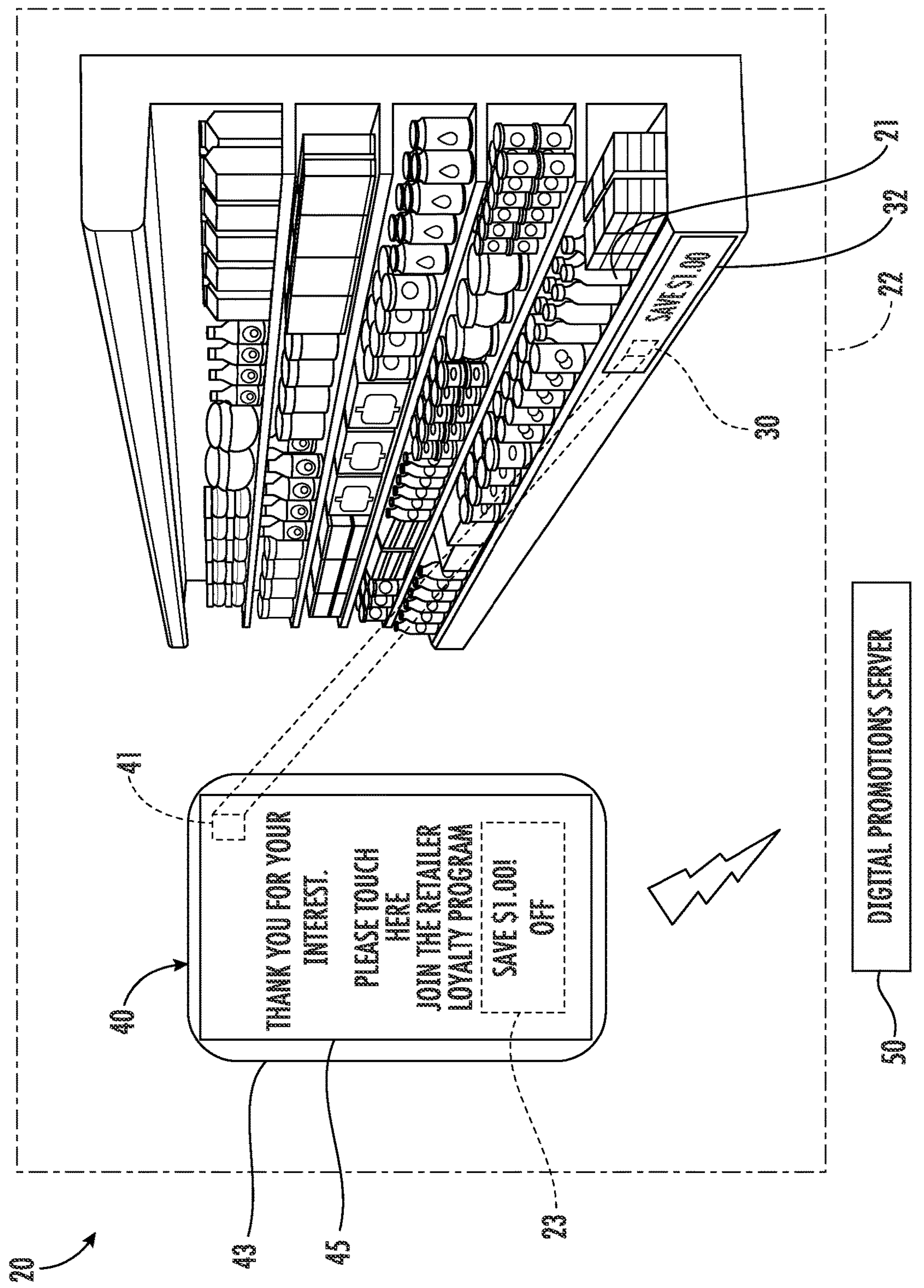
FIG. 1 is a diagram of a digital promotion processing system in accordance with an embodiment.
Figure 2:
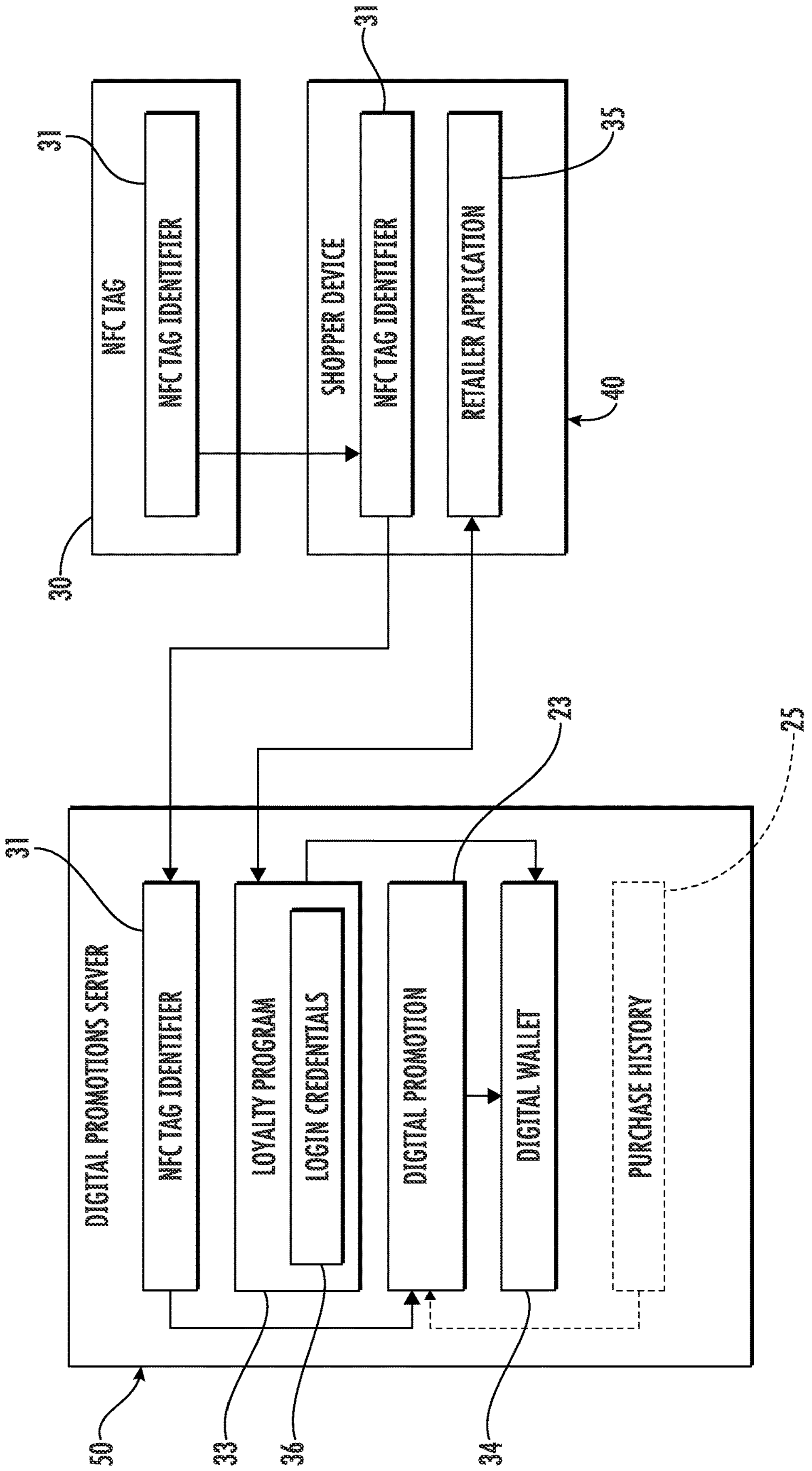
FIG. 2 is a schematic operational diagram of the digital promotion processing system of FIG. 1.
Figure 3:
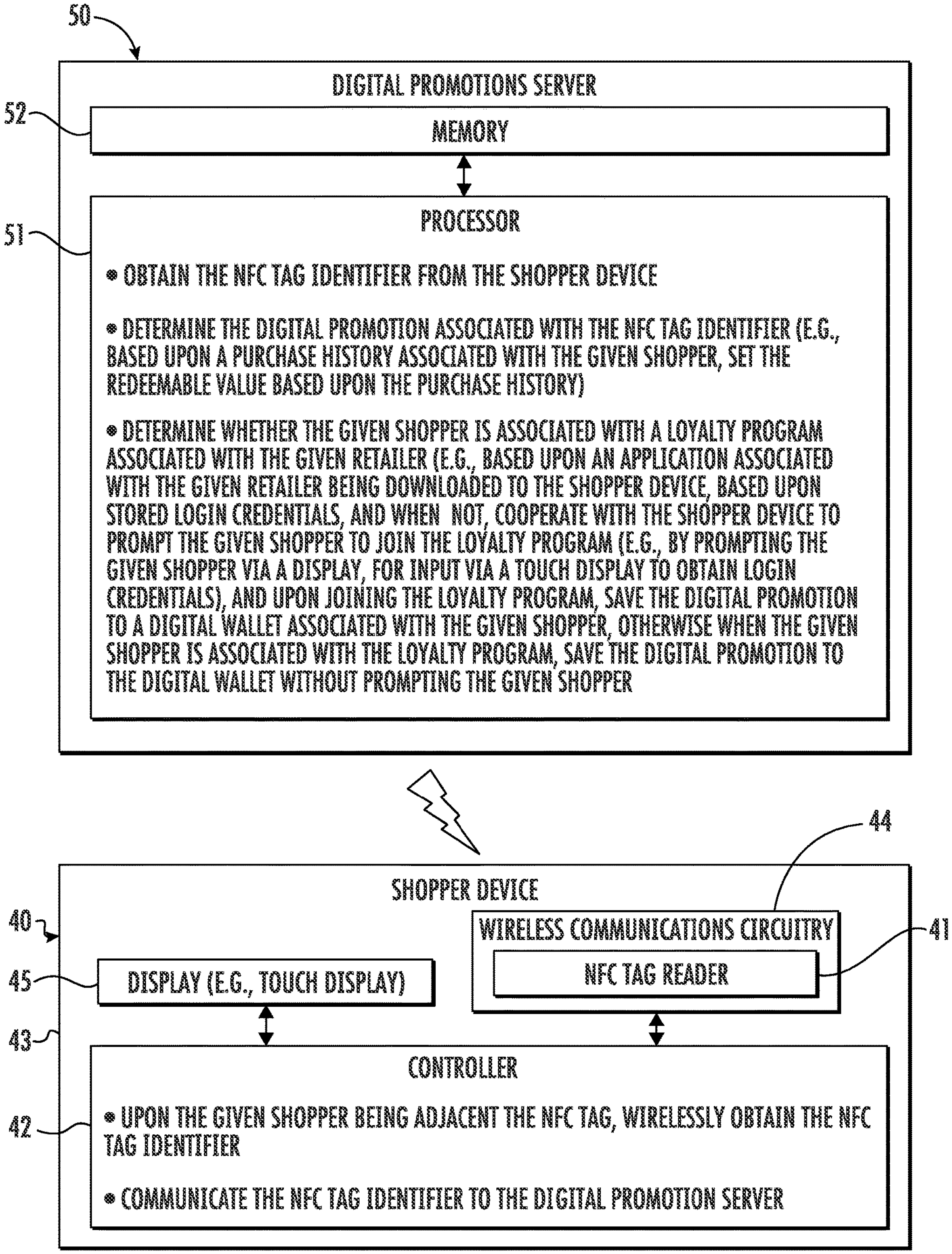
FIG. 3 is a schematic diagram of the digital promotions server and shopper device of the digital promotion processing system of FIG. 1.

Referring initially to FIGS. 1-3, a digital promotion processing system 20 includes a digital promotions server 50. The digital promotions server 50 includes a processor 51 and an associated memory 52. While operations of the digital promotions server 50 are described herein, the processor 51 and the memory 52 cooperate to perform those operations.

The digital promotion processing system 20 also includes a near field communication (NFC) tag 30. The NFC tag is associated with a given product for purchase 21 at a given retailer 22. The given retailer 22 may operate one or more physical stores or physical locations (e.g., brick-and-mortar).

The NFC tag 30 may be carried by (e.g., embedded within, coupled to via an adhesive layer) signage 32 adjacent the product for purchase 21. For example, the signage 32 may be in the form of an aisle violator and include text and graphics indicating a digital promotion 23 may be available for the product for purchase 21. Of course, the signage 32 may be part of an end-cap display at the end of an aisle at the retailer 22, or elsewhere. Additionally, in embodiments, the NFC tag 30 may not be carried by any signage and may be a standalone device, for example, adjacent the product for purchase 21. A given retailer 22 may have more than one NFC tag 30 each associated with a corresponding product for purchase 21.

The digital promotion 23 may be in the form of a digital coupon redeemable toward a discount for the product for purchase 21, for example, at the completion of or during the checkout process at a point-of-sale (POS) device at the given retailer 22. The digital promotion 23 may be in the form of a digital rebate, for example, redeemable post-purchase. Of course, the digital promotion 23 may be redeemable toward another product for purchase that is not the given product for purchase 21, as will be described in further detail below.

The NFC tag 30 is encoded with an NFC tag identifier 31 associated therewith. The NFC tag identifier 31 may be a unique identifier or data that is associated with the digital promotion 23 or identifies the digital promotion. For example, the NFC tag identifier 31 represent encoding of the digital promotion 23 or digital coupon, or offer, and may include instructions for saving of the digital promotion and redemption of the digital promotion.

As will be appreciated by those skilled in the art an NFC tag 30 is a passive device that allows for communications with an active device, such as a shopper device 40, as will be described in further detail below. The NFC tag 30 may operate using the ISO/IEC 14443 type A or type B standards, and more particularly, operate as a Type 1 NFC tag. A Type 1 NFC tag may be relatively simple to implement and cost effective relative to other NFC tag types. As a Type 1 NFC tag, the NFC tag 30 may have both read and write capabilities and a relatively low data rate and memory size (e.g., 106 kb/s, 96 bytes), for example.

The shopper device 40 is associated with the given shopper. The shopper device 40 is illustratively in the form of a mobile wireless communications device, and more particularly, a mobile or smart phone. The shopper device 40 may be a different type of device, for example, a tablet computer, laptop computer, or wearable device.

The shopper device 40 includes a housing 43, wireless communications circuitry 44 carried by the housing and a controller 42 coupled to the wireless communications circuitry. The wireless communications circuitry 44 may be mid- or long-range wireless communications circuitry (e.g., WiFi, cellular, Bluetooth) cooperating with the controller 42 to perform one or more mid- or long-range wireless communications functions, as will be appreciated by those skilled in the art. The shopper device 40 also includes a display 45, for example, a touch display, coupled to the controller 42. Those skilled in the art will appreciate that as a touch display, the display 45 may provide visual output and accept touch input.

The wireless communications circuitry 44 also includes an NFC tag reader 41 coupled to the controller 42. The NFC tag reader 41 cooperates with the controller 42 to, upon the shopper device 40 being adjacent the NFC tag 30, wirelessly obtain the NFC tag identifier 31 and communicate the NFC tag identifier to the digital promotions server 50. For example, as the given shopper traverses an aisle in the given retailer 22, the given shopper may view the signage 32 indicative of the digital promotion 23, and, if there is interest on the part of the given shopper, the given shopper may hold their shopper device 40 adjacent or next to (e.g., within NFC communications proximity) the NFC tag 30 to execute operations related to the digital promotion, as will be described in further detail below.

As will be appreciated by those skilled in the art, the NFC tag 30 and the NFC reader 41 together may operate in a passive mode, and more particularly, in a reader/writer mode, for example. In the passive mode, the active device, in this case, the shopper device 40, reads data or the NFC tag identifier 31 from the NFC tag 30. When the shopper device 40 comes into proximity to the NFC tag 30, the shopper device generates a carrier field, which modulates the NFC tag. The electromagnetic (EM) field that is produced by the shopper device 40 supplies the NFC tag 30 with the power to function. As the NFC tag 30 is powered by the EM field, the shopper device 40 is enabled to read the data from the NFC tag (i.e., the NFC tag identifier 31).

Figure 4:
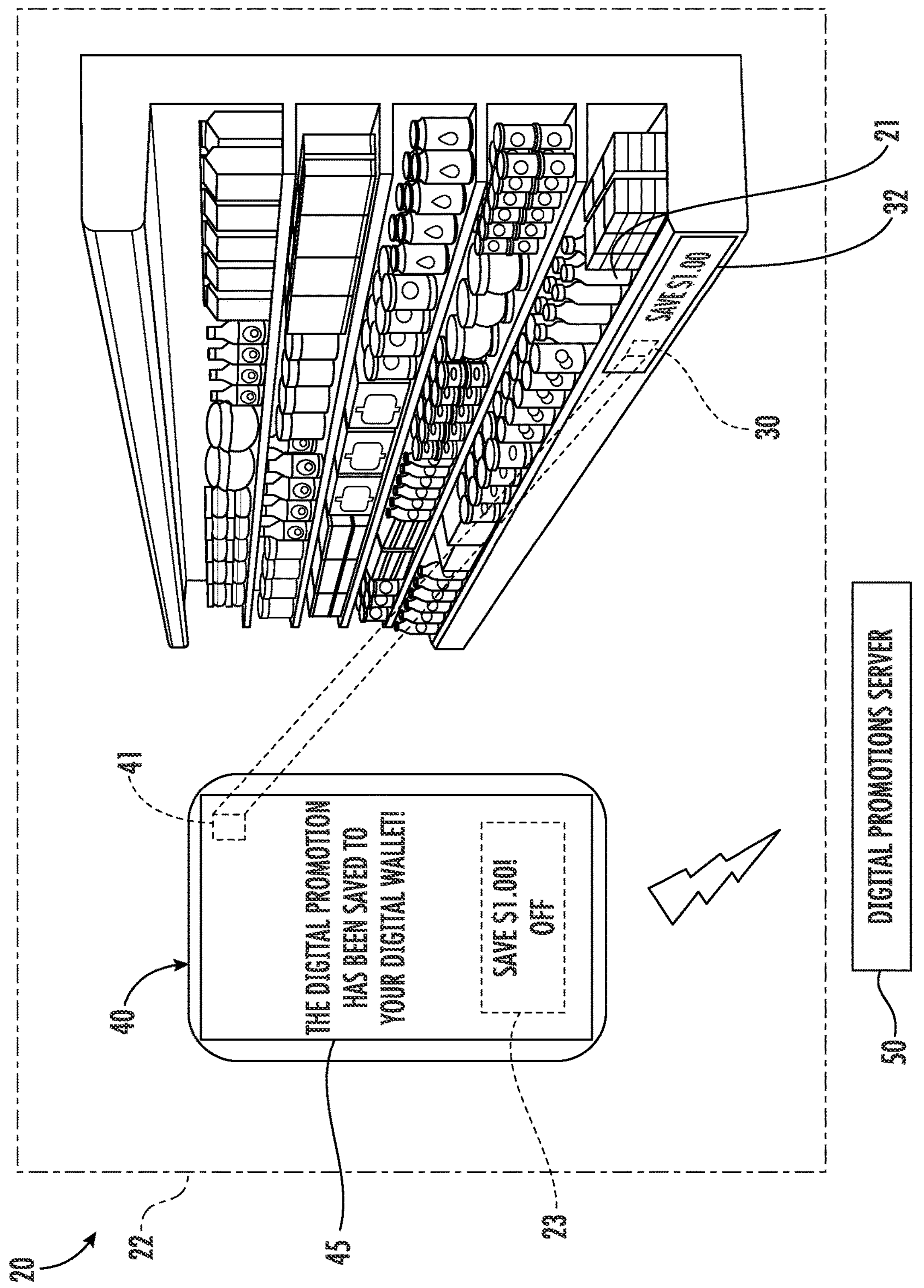
FIG. 4 is a diagram of the digital promotion processing system illustrating saving a digital promotion to a digital wallet in accordance with an embodiment.
Figure 5:
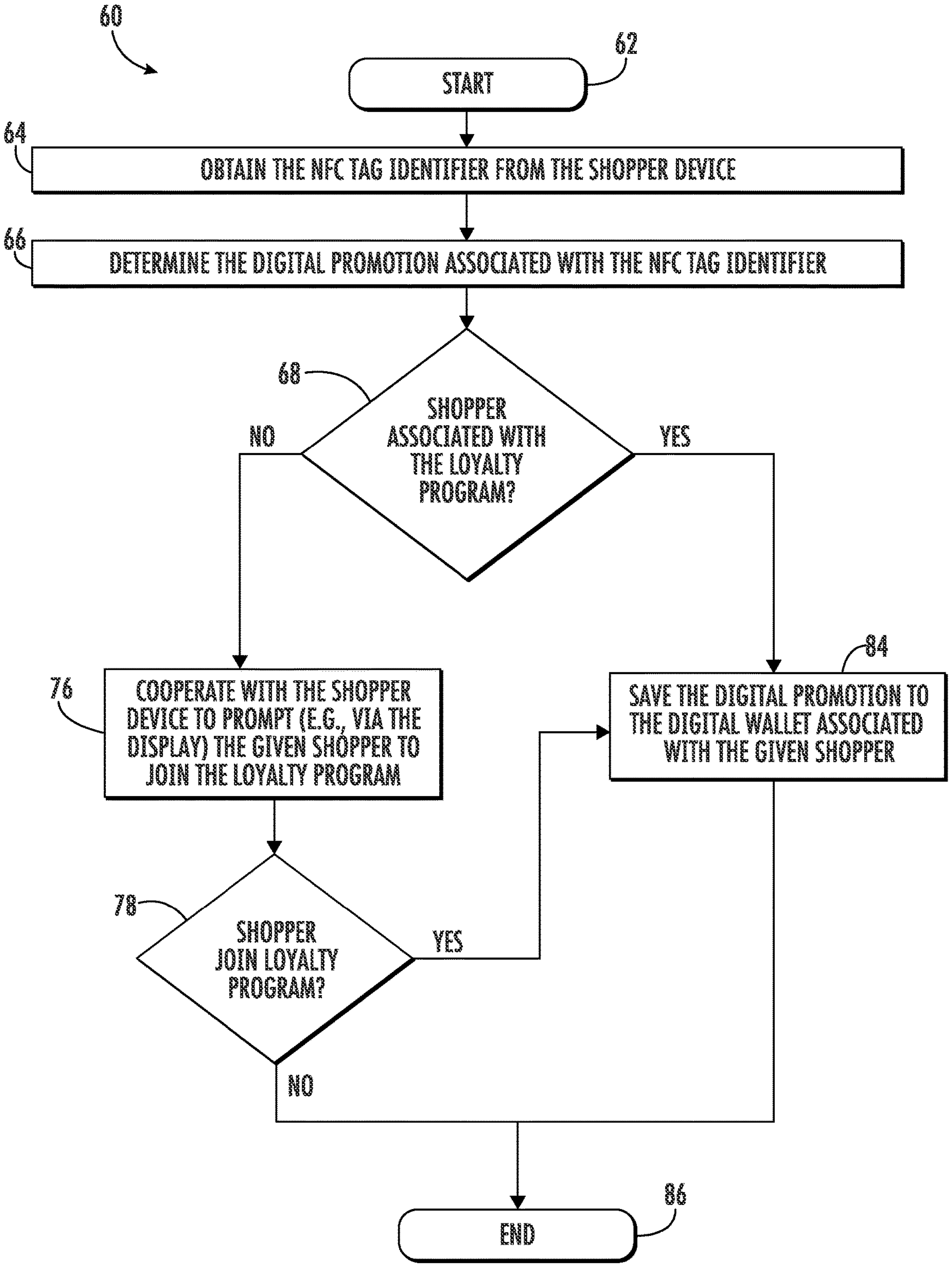
FIG. 5 is flowchart of operation of the digital promotions server of FIG. 3.

Referring now additionally to FIG. 4, and the flowchart 60 in FIG. 5, beginning at Block 62 operations of the digital promotions server 50 will now be described. At Block 64 the digital promotions server 50 obtains the NFC tag identifier 31 from the shopper device 40. The digital promotions server 50 determines, at Block 66, the digital promotion 23 associated with the NFC tag identifier 31. The digital promotions server 50 may determine the digital promotion 23 by matching the NFC tag identifier 31 to one of stored NFC tag identifiers, for example, stored in the memory 52. The NFC tag identifier 31 may be, may be part of, or may be extracted from an application programming interface (API) call to the digital promotions server 50. For example, the API call may include instructions for the execution of operations between the digital promotions server 50 and the shopper device 40 as they relate to the digital promotion 23 (i.e., the digital promotion determined by the NFC tag identifier 31).

The digital promotions server 50 determines whether the given shopper is associated with a loyalty program 33 that is associated with the given retailer 22 (Block 68). As will be appreciated by those skilled in the art, the given retailer 22 may operate the loyalty program 33 to permit shoppers to view and save digital promotions 23 or coupons to corresponding digital wallets 34, which may be targeted or individualized on a per shopper basis. The given retailer 22 may also operate the loyalty program 33 to provide rewards to incentivize purchases, maintain a purchase history, and/or obtain product information, such as, for example, recipes, nutritional information, and/or recall information. The loyalty program 33 may be embodied within a retailer application 35, which is downloadable to the shopper device 40.

Enrollment in the loyalty program 33, for example, may be determined via the retailer application 35. For example, the digital promotions server 50 may determine whether the given shopper is associated with or is signed up in the loyalty program 33 based upon the retailer application 35 being on or downloaded to the shopper device 40. Whether the retailer application 35 has been downloaded on the shopper device 40 may be determined, for example, on the shopper device, and the result of this determination may be communicated to the digital promotions server 50, for example, as part of the above-described API call.

Alternatively or additionally, the digital promotions server 50 may determine whether the given shopper is associated with or enrolled in the loyalty program 33 based upon the existence of login credentials 36 associated with the given shopper for signing into the loyalty program, e.g., via the retailer application 35. The login credentials 36 may include a user identifier and/or password associated with the given shopper. The user identifier may include a username, phone number, and/or email address, for example. In embodiments, the login credentials 36 may be stored on the shopper device 40 and communicated to the digital promotions sever 50 upon tapping of the NFC tag 30 and/or with the NFC tag identifier 31.

In other embodiments, the digital promotions server 50 may determine whether login credentials 36 exist by comparing an identifier to a stored identifier, the stored identifier being used as an index to identify whether stored login credentials exist. For example, a shopper phone number may be used as an index and used to see if a stored password exists, which may be an indicator that the given shopper is associated with the loyalty program 33. The existence of stored login credentials 36 may also be indicative that the given shopper may have downloaded the application 35 associated with the given retailer 22. Of course, when login credentials 36 may be stored on the shopper device 40, the existence of stored login credentials on the shopper device may not be an indicator that the given shopper is enrolled in the loyalty program 33 since those stored login credentials may be used by other applications, such as, for example, a web browser for accessing a website associated with the given retailer 22.

In some embodiments, the digital promotions server 50 may (e.g., as part of the above-described API call) obtain a device identifier associated with the shopper device 40 and match the device identifier to a given shopper. The digital promotions server 50 may alternatively or additionally obtain (e.g., as part of the above-described API call) other identifying information associated with the given shopper and/or the shopper device 40 (e.g., information to identify the given shopper.

If, at Block 68, the given shopper is not associated with or enrolled in the loyalty program 33, the digital promotions server 50 cooperates with the shopper device 40 to prompt, for example, via the display 45, the given shopper to join the loyalty program (Block 76) (FIG. 1). More particularly, the digital promotions server 50 may cooperate with shopper device 40 by communicating instructions that cause the display 45 of the shopper device to prompt for the given shopper to join the loyalty program 33. The given shopper may join or enroll in the loyalty program 33 by providing desired login credentials via input, for example, to the display 45 when the display is in the form of a touch display.

Upon the given shopper joining the loyalty program (Block 78), the digital promotions server 50 saves the digital promotion 23 to a digital wallet 34 associated with the given shopper, and more particularly, within a digital wallet that may be part of or a feature of the loyalty program 33 (FIG. 4). In embodiments, the digital promotion server 50 may additionally cooperate with the shopper device 40 display additional digital promotions or other information regarding products for purchase, such as, for example, other savings opportunities. If, at Block 78, the given shopper does not join the loyalty program 33, the operations end at Block 86 and without the digital promotion 23 being saved to the digital wallet 34. In other words, the given shopper may not be able to redeem the digital promotion 23.

When the given shopper is associated with the loyalty program (Block 68), or when the given shopper has already or previously joined the loyalty program 33, the digital promotions server 50 saves the digital promotion 23 to the digital wallet associated with the given shopper and without prompting the given shopper (Block 84) (FIG. 4). In other words, the digital promotion may be saved to the digital wallet 34 with nothing more than a "tap" of the shopper device 40 to the NFC tag 30. Operations end at Block 86. In embodiments, the digital promotion server 50 may additionally cooperate with the shopper device 40 display additional digital promotions or other information regarding products for purchase, such as, for example, other savings opportunities, as described above.

Figure 6:
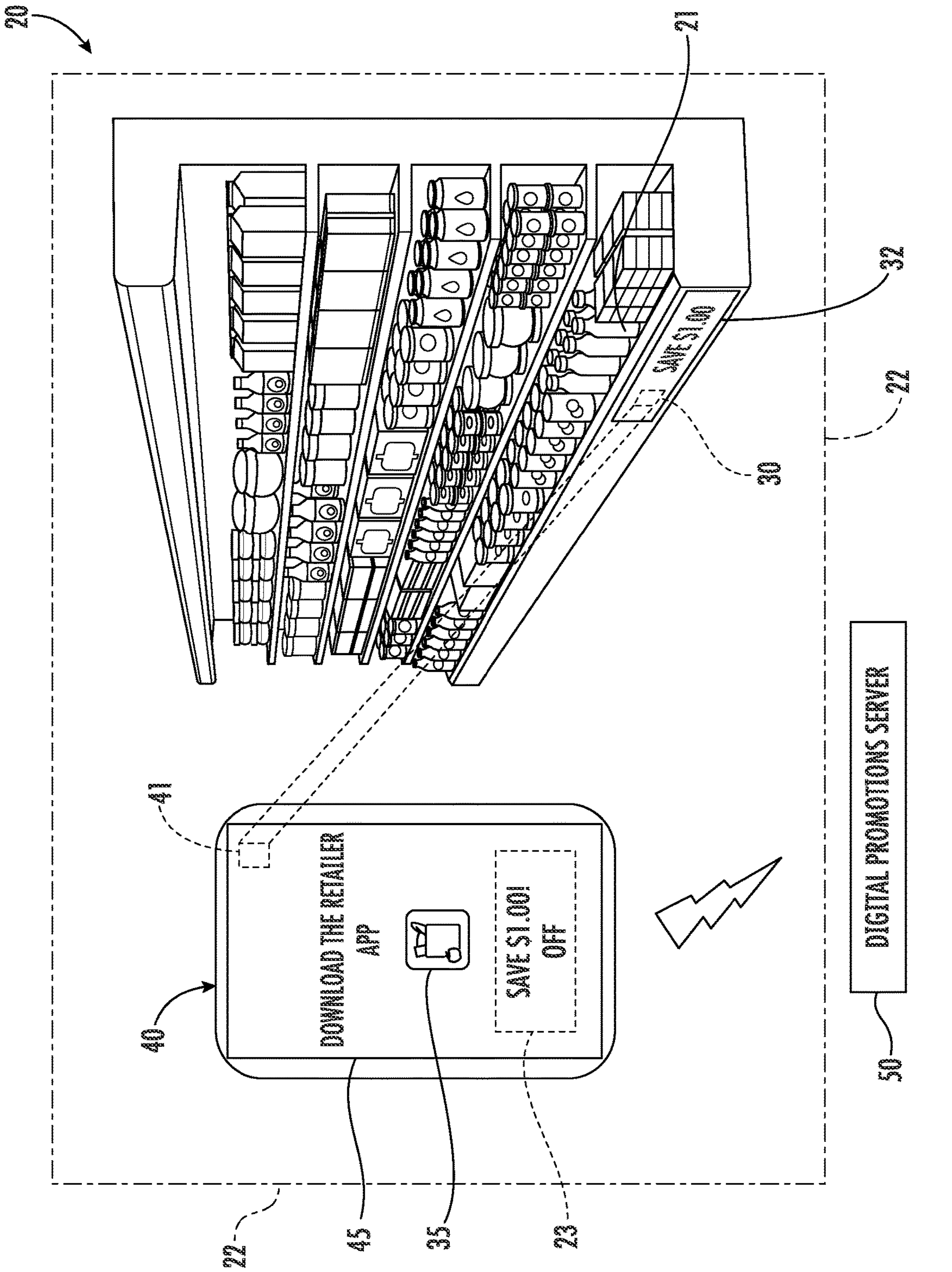
FIG. 6 is a diagram of the digital promotion processing system illustrating prompting for downloading of a retailer application in accordance with an embodiment.
Figure 7:
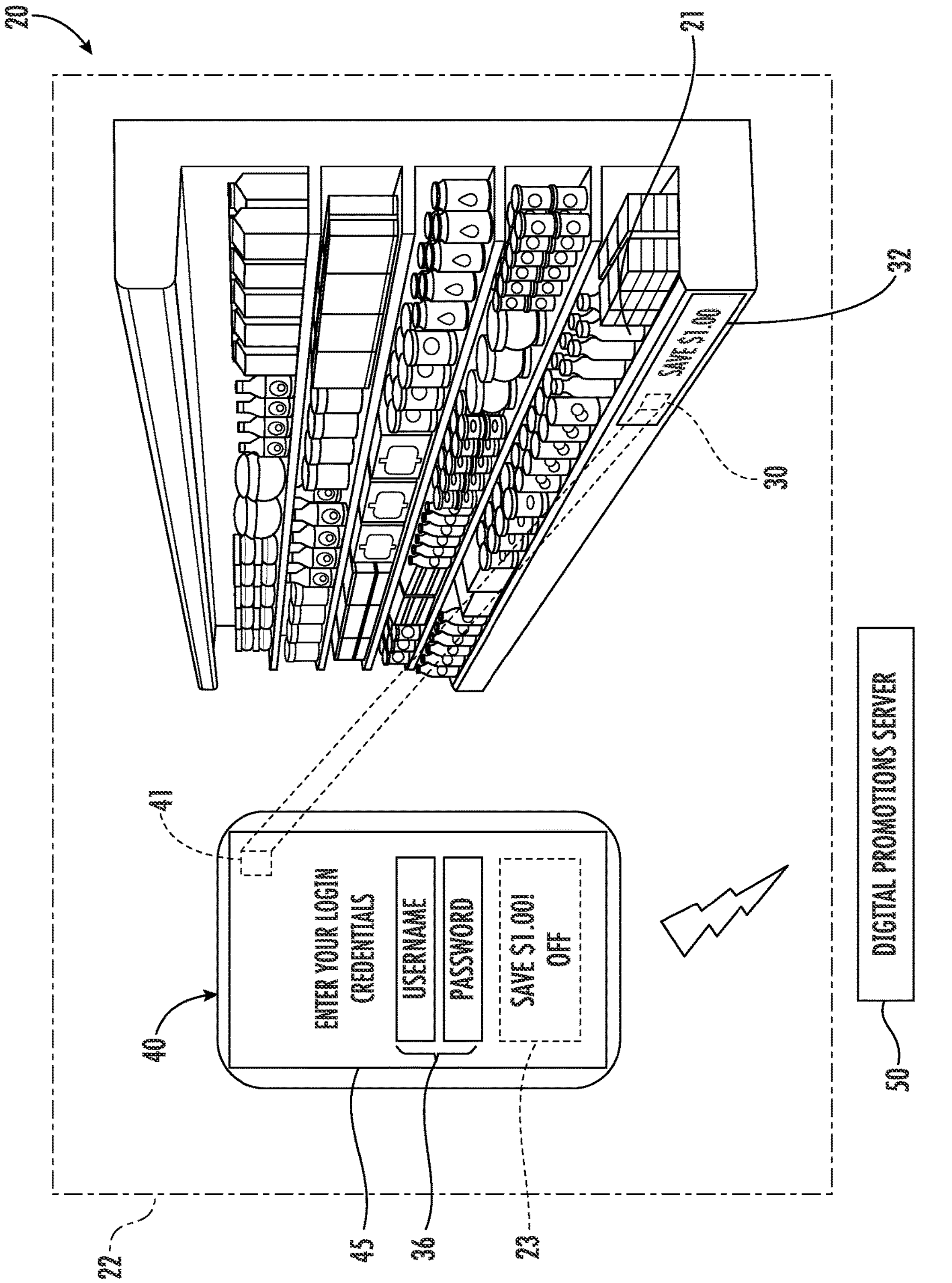
FIG. 7 is a diagram of the digital promotion processing system illustrating prompting for login credentials in accordance with an embodiment.
Figure 8A:
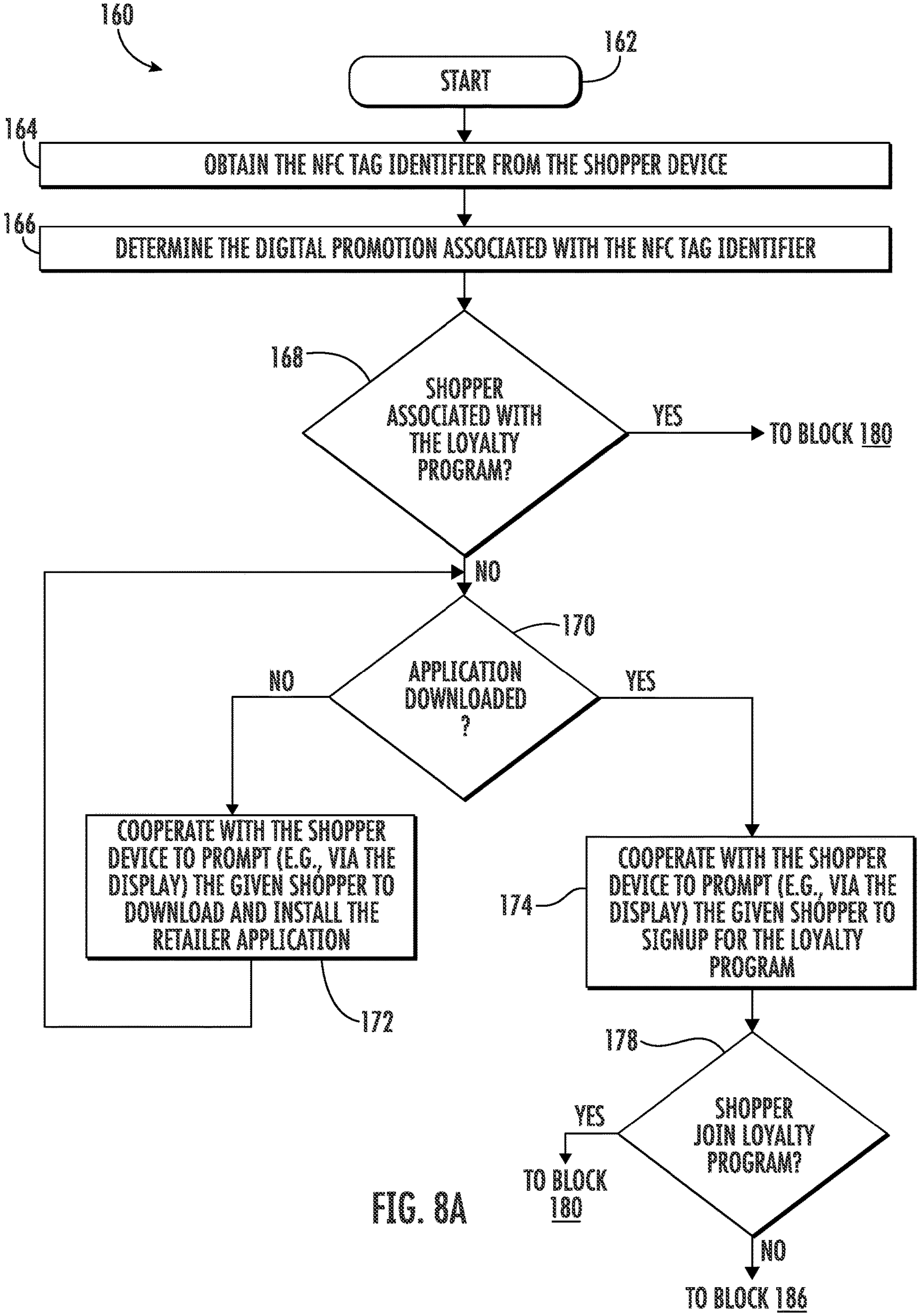
FIGS. 8A and 8B are flow diagrams illustrating more detailed operation of the digital promotions server of FIG. 3.
Figure 8B:
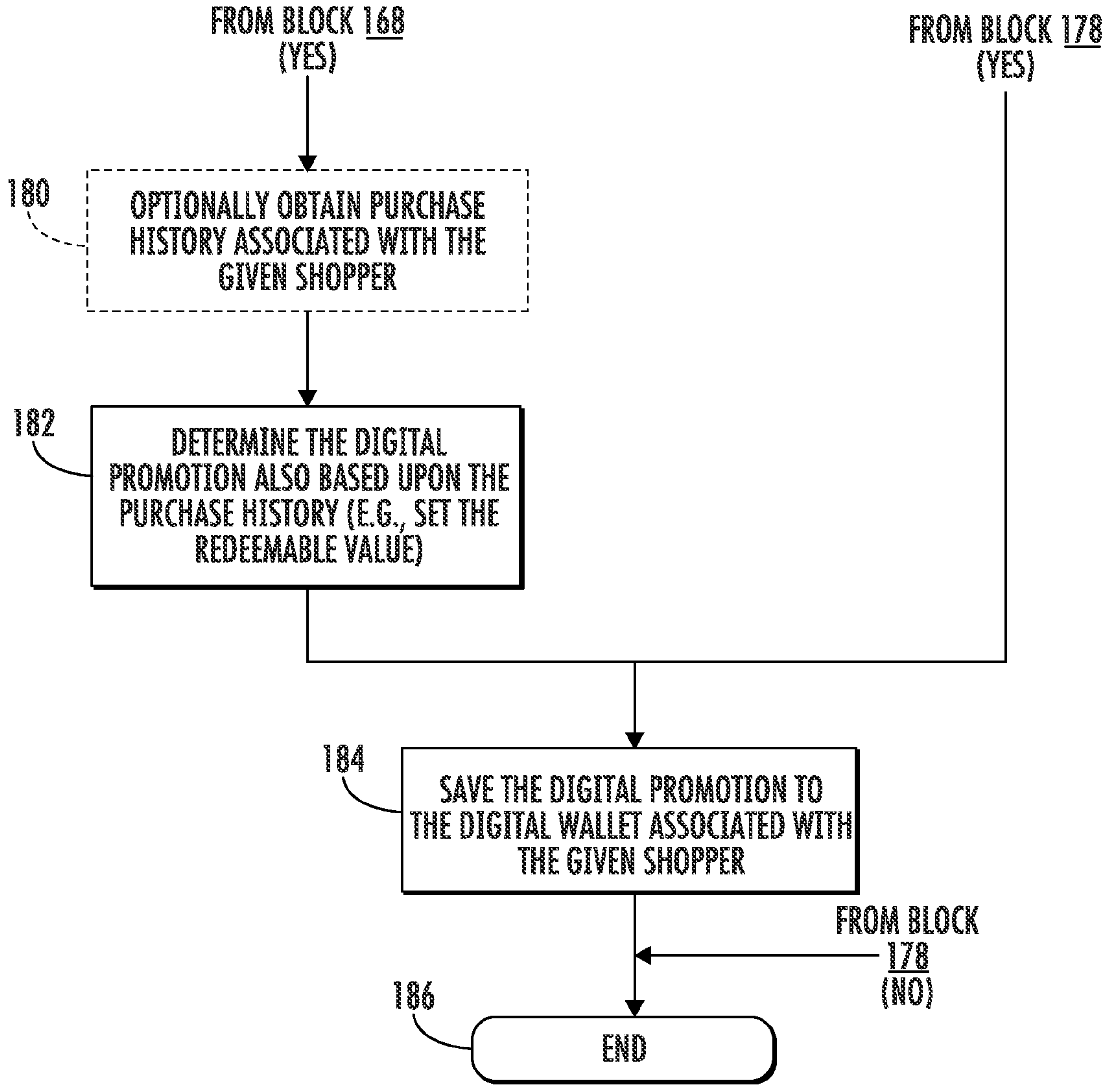

Referring now to FIGS. 6-7 the flowchart 160 in FIGS. 8A and 8B, beginning at Block 162, a more detailed sequence of operations of the digital promotions server 50 as they relate to the joining the loyalty program 33 will now be described. At Block 168, the digital promotions server 50 determines whether the given shopper is associated with the loyalty program 33, for example, by determining if stored login credentials 36 exist for the given shopper. Of course, while the existence of the stored login credentials 36 are used to determine whether the given shopper is associated with the loyalty program 33, those skilled in the art will appreciate that the digital promotions server 50 may determine whether the given shopper is associated with the loyalty program using any of the techniques described above.

If, at Block 168, the given shopper is not associated with or part of the loyalty program 33, the digital promotions server 50 cooperates with the shopper device 40 to determine whether the application 35 associated with the given retailer 22 has been downloaded and/or installed on the shopper device (Block 170) (FIG. 6). If the retailer application 35 has not been downloaded or installed (Block 170), the digital promotions server 50 cooperates with the shopper device 40, as described above, to prompt the given shopper to download or install the application on the shopper device (e.g., via the display 45) (Block 172) (FIG. 6).

When at Block 170 the application has already been downloaded, or after the application has been downloaded (Block 172), the digital promotions server 50 cooperates with the shopper device 40 to prompt, via the display 45, the given shopper to sign up for the loyalty program 33 (Block 174). More particularly, the digital promotions server 50 may cooperate with the shopper device 40 to accept as part of the sign-up and via the display 45, a desired username and, optionally, password, for example, as described above (FIG. 7). Upon entry or acceptance of the desired login credentials 36 (e.g., when the login credentials are stored) at Block 178, the digital promotions server 50 saves the digital promotion 23 to the digital wallet 34 associated with the given shopper (Block 184) (FIG. 4).

When, at Block 168, the given shopper is determined to be associated with the loyalty program 33, the digital promotions server 50 may optionally obtain a purchase history 25 associated with the given shopper (Block 180). The purchase history 25 may be obtained via the loyalty program 33, for example, using the login credentials 36. At Block 182, the digital promotions server 50 determines the digital promotion 23 also based upon the purchase history 25 and/or sets the redeemable value of the digital promotion also based upon the purchase history. For example, if the given shopper typically purchases Brand-A products, the determined digital promotion 23 may be (e.g., updated or changed) for any of another Brand-A product (other than the product associated with the NFC tag 30), another brand of product in a similar or same category of the given product, be for the given product for purchase, but have a higher redemption rate than a baseline, or be for the given product for purchase, but have a lower redemption rate than the baseline. In other words, the digital promotions server 50 may be considered to update the digital promotion 23 based upon the purchase history 25. In some embodiments, the digital promotions server 50 may obtain the purchase history 25 using other techniques such that the digital promotion 23 may be determined or updated based upon the obtained purchase history. The digital promotion is saved to the digital wallet 34 at Block 184 (FIG. 4).

In some embodiments, the digital promotions server 50 may determine the digital promotion 23 based upon the purchase history 25 without setting the redeemable value based upon the purchase history, or set the redeemable value based upon the purchase history without determining the digital promotion based upon the purchase history. The operations at Blocks 164-168, 178, and 184 are similar to the operations 64-68, 78, and 84 described above. Operations end at Block 186.

A method aspect is directed to a method of processing a digital promotion 23. The method includes using a digital promotions server 50 to cooperate with a shopper device 40 associated with a given shopper to obtain a near field communication (NFC) tag identifier 31 encoding an NFC tag 30 associated with a given product for purchase 21 at a given retailer 22. The shopper device 40 includes an NFC tag reader 41 and a controller 42 coupled to the NFC tag reader, and the controller may be configured to, upon the shopper device being adjacent an NFC tag 30, wirelessly obtain the NFC tag identifier 31. The method also includes using the digital promotions server 50 to determine the digital promotion 23 associated with an NFC tag identifier 31 encoded NFC tag 30, and determine whether the given shopper is associated with a loyalty program 33 associated with the given retailer 22, and when not, cooperate with the shopper device 40 to prompt the given shopper to join the loyalty program, and upon joining the loyalty program save the digital promotion 23 to a digital wallet 34 associated with the given shopper. The method further includes using the digital promotions server 50, when the given shopper is associated with the loyalty program 33, save the digital promotion 23 to the digital wallet 34 without prompting the given shopper.

A computer readable medium aspect is directed to a non-transitory computer for processing a digital promotion 23. The non-transitory computer readable medium includes computer executable instructions that when executed by a processor 51 cause the processor to perform operations. The operations include cooperating with a shopper device 40 associated with a given shopper to obtain a near field communication (NFC) tag identifier 31 encoding an NFC tag 30 associated with a given product for purchase 21 at a given retailer 22. The shopper device 40 includes an NFC tag reader 41 and a controller 42 coupled to the NFC tag reader, and the controller may be configured to, upon the shopper device being adjacent an NFC tag 30, wirelessly obtain the NFC tag identifier 31. The operations also include determining the digital promotion 23 associated with an NFC tag identifier 31 encoded NFC tag 30. The operations further include determining whether the given shopper is associated with a loyalty program 33 associated with the given retailer 22, and when not, cooperating with the shopper device 40 to prompt the given shopper to join the loyalty program 33, and upon joining the loyalty program save the digital promotion 23 to a digital wallet 34 associated with the given shopper, otherwise when the given shopper is associated with the loyalty program, saving the digital promotion to the digital wallet without prompting the given shopper.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:

a digital promotions server;

a near field communication (NFC) tag associated with a given product for purchase at a given retailer, the NFC tag being encoded with an NFC tag identifier associated with a digital promotion; and a shopper device associated with a given shopper and comprising a display, an NFC tag reader, and a controller coupled to the display and the NFC tag reader, the controller configured to operate a retailer application embodying a loyalty program associated with a given retailer when the retailer application is stored on the shopper device, store login credentials for the loyalty program, operate the NFC tag reader in a passive mode to wirelessly obtain the NFC tag identifier so that upon the shopper device being adjacent the NFC tag, the shopper device generates a carrier field that modulates the NFC tag to generate an electromagnetic (EM) field that supplies power to the NFC tag to enable the NFC tag identifier to be read from the NFC tag by the NFC tag reader, upon obtaining the NFC tag identifier via the NFC tag reader, communicate the NFC tag identifier to the digital promotions server, upon communication of the NFC tag identifier to the digital promotions server, determine whether the stored login credentials exist, and when the stored login credentials exist, communicate the login credentials to the digital promotions server, and determine whether the retailer application is stored on the shopper device, and when the retailer application is stored on the shopper device, communicate a result of the determination to the digital promotions server;

the digital promotions server configured to determine the digital promotion associated with the NFC tag identifier, and determine whether the given shopper is associated with the loyalty program based upon the receipt of the login credentials and the result of the determination of the retailer application being indicative that the retailer application is stored on the shopper device, and when not, cooperate with the shopper device to prompt, via the display, the given shopper to join the loyalty program, and upon joining the loyalty program save the digital promotion to a digital wallet associated with the given shopper, otherwise when the given shopper is associated with the loyalty program, save the digital promotion to the digital wallet without prompting the given shopper so that the digital promotion is stored to the digital wallet without more than the shopper device being adjacent the NFC tag.

2. The digital promotion processing system of claim 1 wherein the digital promotions server is configured to, when the retailer application has been determined to not be stored on the shopper device, cooperate with the shopper device to prompt, via the display, the given shopper to download the retailer application prior to joining the loyalty program.

3. The digital promotion processing system of claim 1 wherein the digital promotions server is configured to save the digital promotion to the digital wallet associated with the given shopper based upon the stored login credentials.

4. The digital promotion processing system of claim 1 wherein the display comprises a touch display; and wherein the digital promotions server is configured to cooperate with the shopper device to obtain loyalty program login credentials to join the loyalty program via input to the touch display.

5. The digital promotion processing system of claim 1 wherein the digital promotions server is configured to obtain a purchase history associated with the given shopper, and determine the digital promotion based upon the purchase history.

6. The digital promotion processing system of claim 5 wherein the digital promotion has a redeemable value associated therewith; and wherein the digital promotions server is configured to set the redeemable value of the digital promotion based upon the purchase history.

7. A digital promotions server comprising:

a processor and an associated memory configured to cooperate with a shopper device associated with a given shopper to obtain a near field communication (NFC) tag identifier encoding an NFC tag associated with a given product for purchase at a given retailer, the shopper device comprising a display, an NFC tag reader, and a controller coupled to the display and the NFC tag reader, the controller configured to operate a retailer application embodying a loyalty program associated with a given retailer when the retailer application is stored on the shopper device, store login credentials for the loyalty program associated with the given retailer, operate the NFC tag reader in a passive mode to wirelessly obtain the NFC tag identifier so that upon the shopper device being adjacent the NFC tag, the shopper device generates a carrier field that modulates the NFC tag to generate an electromagnetic (EM) field that supplies power to the NFC tag to enable the NFC tag identifier to be read from the NFC tag by the NFC tag reader, upon obtaining the NFC tag identifier via the NFC tag reader, communicate the NFC tag identifier to the digital promotions server, upon communication of the NFC tag identifier to digital promotions server, determine whether the stored login credentials exists, and when the stored login credentials exist, communicate the login credentials to the digital promotions server, and determine whether the retailer application is stored on the shopper device, and when the retailer application is stored on the shopper device, communicate a result of the determination to the digital promotions server, determine a digital promotion associated with the NFC tag identifier encoded NFC tag, and determine whether the given shopper is associated with the loyalty program based upon the receipt of login credentials and the result of the determination of the retailer application being indicative that the retailer application is stored on the shopper device, and when not, cooperate with the shopper device to prompt, via the display, the given shopper to join the loyalty program, and upon joining the loyalty program save the digital promotion to a digital wallet associated with the given shopper, otherwise when the given shopper is associated with the loyalty program, save the digital promotion to the digital wallet without prompting the given shopper so that the digital promotion is stored to the digital wallet without more than the shopper device being adjacent the NFC tag.

8. The digital promotions server of claim 7 wherein the processor is configured to cooperate with the shopper device to, when the retailer application has been determined to not be stored on the shopper device, prompt the given shopper to download the application prior to joining the loyalty program.

9. The digital promotions server of claim 7 wherein the processor is configured to obtain a purchase history associated with the given shopper, and determine the digital promotion based upon the purchase history.

10. The digital promotions server of claim 9 wherein the digital promotion has a redeemable value associated therewith; and wherein the processor is configured to set the redeemable value of the digital promotion based upon the purchase history.

11. A method of processing a digital promotion comprising:

using a digital promotions server to cooperate with a shopper device associated with a given shopper to obtain a near field communication (NFC) tag identifier encoding an NFC tag associated with a given product for purchase at a given retailer, the shopper device comprising a display, an NFC tag reader, and a controller coupled to the display and the NFC tag reader, the controller configured to operate a retailer application embodying a loyalty program associated with a given retailer when the retailer application is stored on the shopper device, store login credentials for the loyalty program associated with the given retailer, operate the NFC tag reader in a passive mode to wirelessly obtain the NFC tag identifier so that upon the shopper device being adjacent the NFC tag, the shopper device generates a carrier field that modulates the NFC tag to generate an electromagnetic (EM) field that supplies power to the NFC tag to enable the NFC tag identifier to be read from the NFC tag by the NFC tag reader, upon obtaining the NFC tag identifier, communicate the NFC tag identifier to the digital promotions server, upon communication of the NFC tag identifier to the digital promotions server, determine whether the stored login credentials exist, and when the stored login credentials exist, communicate the login credentials to the digital promotions server, and determine whether the retailer application is stored on the shopper device, and when the retailer application is stored on the shopper device, communicate a result of the determination to the digital promotions server, determine the digital promotion associated with the NFC tag identifier encoded NFC tag, and determine whether the given shopper is associated with the loyalty program based upon the receipt of the login credentials and the result of the determination of the retailer application being indicative that the retailer application is stored on the shopper device, and when not, cooperate with the shopper device to prompt, via the display, the given shopper to join the loyalty program, and upon joining the loyalty program save the digital promotion to a digital wallet associated with the given shopper, otherwise when the given shopper is associated with the loyalty program, save the digital promotion to the digital wallet without prompting the given shopper so that the digital promotion is stored to the digital wallet without more than the shopper device being adjacent the NFC tag.

12. The method of claim 11 wherein using the digital promotions server comprises using the digital promotions server to, when the retailer application has been determined to not be stored on the shopper device, cooperate with the shopper device to prompt the given shopper to download the application prior to joining the loyalty program.

13. The method of claim 11 wherein using the digital promotions server comprises using the digital promotions server to obtain a purchase history associated with the given shopper, and determine the digital promotion based upon the purchase history.

14. The method of claim 13 wherein the digital promotion has a redeemable value associated therewith; and wherein using the digital promotions server comprises using the digital promotions server to set the redeemable value of the digital promotion based upon the purchase history.

15. A non-transitory computer readable medium for processing a digital promotion, the non-transitory computer readable medium comprising computer executable instructions that when executed by a processor cause the processor to perform operations comprising:

cooperating with a shopper device associated with a given shopper to obtain a near field communication (NFC) tag identifier encoding an NFC tag associated with a given product for purchase at a given retailer, the shopper device comprising a display, an NFC tag reader, and a controller coupled to the display and the NFC tag reader, the controller configured to operate a retailer application embodying a loyalty program associated with a given retailer when the retailer application is stored on the shopper device, store login credentials for the loyalty program associated with the given retailer, operate the NFC tag reader in a passive mode to wirelessly obtain the NFC tag identifier so that upon the shopper device being adjacent the NFC tag, the shopper device generates a carrier field that modulates the NFC tag to generate an electromagnetic (EM) field that supplies power to the NFC tag to enable the NFC tag identifier to be read from the NFC tag by the NFC tag reader, upon obtaining the NFC tag identifier via the NFC tag reader, communicate the NFC tag identifier to the digital promotions server, upon communication of the NFC tag identifier to the digital promotions server, determine whether the stored login credentials exist, and when the stored login credentials exist, communicate the login credentials to the digital promotions server, and determine whether the retailer application is stored on the shopper device, and when the retailer application is stored on the shopper device, communicate a result of the determination to the digital promotions server;

determining the digital promotion associated with the NFC tag identifier encoded NFC tag; and determining whether the given shopper is associated with the loyalty program based upon the receipt of the login credentials and the result of the determination of the retailer application being indicative that the retailer application is stored on the shopper device, and when not, cooperating with the shopper device to prompt, via the display, the given shopper to join the loyalty program, and upon joining the loyalty program save the digital promotion to a digital wallet associated with the given shopper so that the digital promotion is stored to the digital wallet without more than the shopper device being adjacent the NFC tag.

16. The non-transitory computer readable medium of claim 15 wherein the operations comprise, when the retailer application has been determined to not be stored on the shopper device, cooperating with the shopper device to prompt the given shopper to download the application prior to joining the loyalty program.

17. The non-transitory computer readable medium of claim 15 wherein the operations comprise obtaining a purchase history associated with the given shopper, and determining the digital promotion based upon the purchase history.

18. The non-transitory computer readable medium of claim 17 wherein the digital promotion has a redeemable value associated therewith; and wherein the operations comprise setting the redeemable value of the digital promotion based upon the purchase history.

* * * * *